US011562747B2

(12) United States Patent
Arar et al.

(10) Patent No.: US 11,562,747 B2
(45) Date of Patent: *Jan. 24, 2023

(54) SPEECH-TO-TEXT TRANSCRIPTION WITH MULTIPLE LANGUAGES

(71) Applicant: International Business Machines Corporation, Armonk, NY (US)

(72) Inventors: Raphael Arar, San Jose, CA (US); Chris Kau, Mountain View, CA (US); Robert J. Moore, San Jose, CA (US); Chung-hao Tan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/209,041

(22) Filed: Mar. 22, 2021

(65) Prior Publication Data

US 2021/0210098 A1 Jul. 8, 2021

Related U.S. Application Data

(63) Continuation of application No. 16/141,792, filed on Sep. 25, 2018, now Pat. No. 11,049,501.

(51) Int. Cl.
*G10L 15/26* (2006.01)
*G10L 15/19* (2013.01)
(Continued)

(52) U.S. Cl.
CPC ............ *G10L 15/26* (2013.01); *G06F 40/40* (2020.01); *G06N 20/00* (2019.01); *G10L 15/18* (2013.01); *G10L 15/19* (2013.01)

(58) Field of Classification Search
CPC . G10L 15/26; G10L 5/26; G10L 13/00; G10L 13/06; G10L 15/18; G10L 15/19;
(Continued)

(56) References Cited

U.S. PATENT DOCUMENTS 6,385,586 B1  5/2002  Dietz
6,925,436 B1  8/2005  Franz
(Continued)

FOREIGN PATENT DOCUMENTS

CN   106340294 A    1/2017
WO   2017112813 A1  6/2017

OTHER PUBLICATIONS

Huang, C-L. et al., "Generation of phonetic units for mixed-language speech recognition based on acoustic and contextual analysis," IEEE Transactions on Computers 9, 2007, pp. 1225-1233, IEEE, United States {Abstract Only}.
(Continued)

*Primary Examiner* — Abdelali Serrou
(74) *Attorney, Agent, or Firm* — Sherman IP LLP; Kenneth L. Sherman; Hemavathy Perumal

(57) ABSTRACT

One embodiment provides a method that includes obtaining a default language corpus. A second language corpus is obtained based on a second language preference. A first transcription of an utterance is received using the default language corpus and natural language processing (NLP). At least one problem word in the first transcription is determined based on an associated grammatical relevance to neighboring words in the first transcription. Upon determining that a first probability score is below a first threshold, an acoustic lookup is performed for an audible match for the problem word in the first transcription based on an associated acoustical relevance. Upon determining that a second probability score is below a second threshold, it is determined whether a match for the problem word exists in the secondary language corpus. Upon determining that the match exists in the secondary language corpus, a second transcription for the utterance is provided.

12 Claims, 7 Drawing Sheets

(51) Int. Cl.
*G10L 15/18* (2013.01)
*G06N 20/00* (2019.01)
*G06F 40/40* (2020.01)

(58) Field of Classification Search
CPC ....... G10L 15/32; G10L 15/063; G10L 15/02; G10L 15/187; G10L 15/005; G10L 15/193; G10L 15/14; G10L 15/144; G10L 15/148; G10L 15/197; G10L 2015/227; G10L 2015/0631; G10L 2015/0638; G10L 25/30; G10L 13/08; G10L 15/00; G10L 15/04; G10L 15/05; G10L 15/06; G10L 15/07; G10L 15/08; G10L 15/1815; G10L 15/183; G10L 15/30; G06F 40/242; G06F 17/2735; G06F 40/263; G06F 40/40; G06F 40/253
See application file for complete search history.

(56) References Cited

U.S. PATENT DOCUMENTS

| | | | |
|---|---|---|---|
| 7,472,061 | B1 | 12/2008 | Alewine |
| 7,596,499 | B2 | 9/2009 | Anguera |
| 8,214,197 | B2 | 7/2012 | Kamatani |
| 8,346,563 | B1 | 1/2013 | Hjelm |
| 8,898,066 | B2 | 11/2014 | Li |
| 8,972,268 | B2 | 3/2015 | Waibel |
| 9,798,653 | B1 | 10/2017 | Shao |
| 9,892,733 | B2* | 2/2018 | Yassa ............... G10L 15/26 |
| 10,943,583 | B1* | 3/2021 | Gandhe ............. G10L 15/183 |
| 2004/0059730 | A1* | 3/2004 | Zhou ................ G06F 40/253 |
| 2004/0123146 | A1 | 6/2004 | Himmel |
| 2005/0091274 | A1 | 4/2005 | Stanford |
| 2005/0187758 | A1 | 8/2005 | Khasin |
| 2005/0197837 | A1 | 9/2005 | Suontausta |
| 2006/0293893 | A1* | 12/2006 | Horvitz .............. G10L 15/1822 704/E15.044 |
| 2008/0114598 | A1 | 5/2008 | Prieto |
| 2009/0240488 | A1 | 9/2009 | White |
| 2009/0248395 | A1 | 10/2009 | Alewine |
| 2009/0313023 | A1 | 12/2009 | Jones |
| 2014/0006029 | A1 | 1/2014 | Stanley |
| 2015/0364129 | A1* | 12/2015 | Gonzalez-Dominguez ........... G10L 15/005 704/251 |
| 2016/0147740 | A1 | 5/2016 | Gao |
| 2016/0179774 | A1* | 6/2016 | McAteer ............ G06F 40/232 704/9 |
| 2016/0267902 | A1 | 9/2016 | Hwang |
| 2017/0025120 | A1 | 1/2017 | Dayan |
| 2017/0047060 | A1 | 2/2017 | Liu |
| 2018/0089172 | A1 | 3/2018 | Needham |
| 2018/0137109 | A1 | 5/2018 | Mangoubi |
| 2018/0233139 | A1 | 8/2018 | Finkelstein |
| 2018/0329894 | A1 | 11/2018 | Zhao |
| 2018/0336900 | A1* | 11/2018 | Zou .................... G06F 40/51 |
| 2019/0189117 | A1 | 6/2019 | Kumar |
| 2019/0318725 | A1 | 10/2019 | Le Roux |
| 2020/0089802 | A1 | 3/2020 | Ronen |

OTHER PUBLICATIONS

Imseng, D. et al. "Towards mixed language speech recognition systems," IDIAP Research Report, Jul. 2010, pp. 1-11, Infoscience.

Mell, P., et al., "The NIST Definition of Cloud Computing", National Institute of Standards and Technology Special Publication 800-145, Sep. 2011, pp. 1-7, U.S. Department of Commerce, United States.

Qian, Y., et al. "A cross-language state sharing and mapping approach to bilingual (Mandarin-English) TTS," IEEE Transactions on Audio, Speech, and Language Processing, Aug. 2009, pp. 1231-1239, 17(6), IEEE, United States.

Sitaram, S. et al., "Speech Synthesis of Code-Mixed Text," LREC, 2016, pp. 3422-3428.

List of IBM Patents or Patent Applications Treated as Related; Arar, R., et al., U.S. Appl. No. 16/141,792, filed Sep. 25, 2018.

* cited by examiner

SPEECH-TO-TEXT TRANSCRIPTION WITH MULTIPLE LANGUAGES

BACKGROUND

Speech-to-text (STT) technologies are not new and have been robustly developed to handle one primary language. Many users, however, can speak more than one language. The primary language set by a STT system can be the second language of a user, e.g., native-Mandarin speakers may be working in environments where English is the primary language. Sometimes it is easier to speak using both primary and secondary languages in the same utterance, e.g., non-native English speakers can include words from their native tongue mid-utterance when searching for the right vocabulary. Currently, STT systems cannot handle language-switching mid-utterance, and the STT system in use will look for an utterance that closely matches words only in the primary language.

SUMMARY

Embodiments relate to speech-to-text (STT) systems with primary, secondary, etc. languages. One embodiment provides a method for bilingual speech-to-text (STT) transcription that includes obtaining a default language corpus. The default language and a second language preference are determined. A second language corpus is obtained based on the second language preference. A first transcription of an utterance is received using the default language corpus and natural language processing (NLP). At least one problem word in the first transcription is determined based on an associated grammatical relevance to neighboring words in the first transcription. The grammatical relevance includes a first probability score. Upon determining that the first probability score is below a first threshold, an acoustic lookup is performed for an audible match for the problem word in the first transcription based on an associated acoustical relevance. The acoustical relevance includes a second probability score. Upon determining that the second probability score is below a second threshold, it is determined whether a match for the problem word exists in the secondary language corpus. Upon determining that the match exists in the secondary language corpus, a second transcription for the utterance is provided.

These and other features, aspects and advantages of the present embodiments will become understood with reference to the following description, appended claims and accompanying figures.

DETAILED DESCRIPTION

Figure 1:
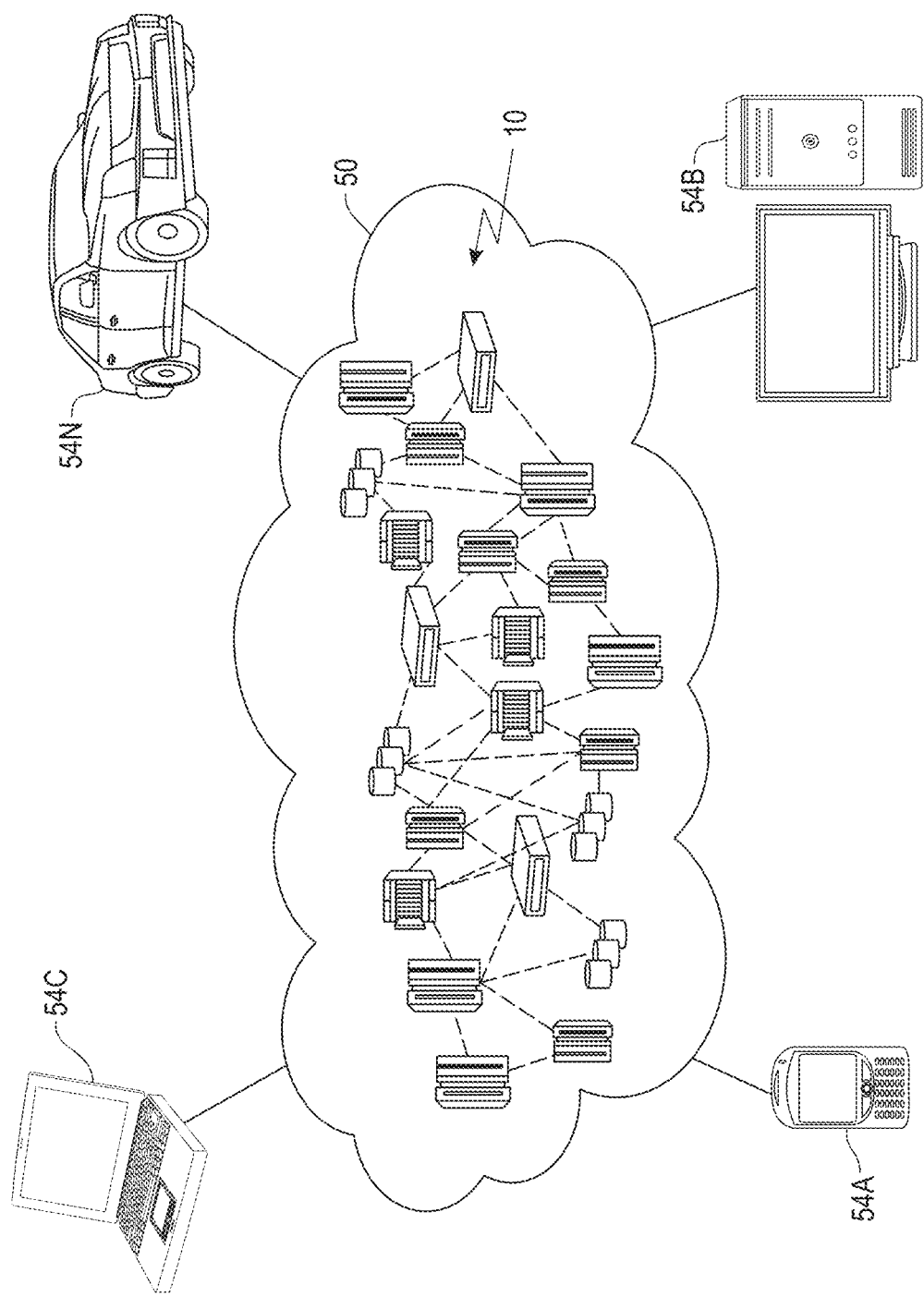
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Embodiments relate to STT systems with primary and secondary, etc. languages. One embodiment provides a method for bilingual speech-to-text (STT) transcription that includes obtaining a default language corpus. The default language and a second language preference are determined. A second language corpus is obtained based on the second language preference. A first transcription of an utterance is received using the default language corpus and natural language processing (NLP). At least one problem word in the first transcription is determined based on an associated grammatical relevance to neighboring words in the first transcription. The grammatical relevance includes a first probability score. Upon determining that the first probability score is below a first threshold, an acoustic lookup is performed for an audible match for the problem word in the first transcription based on an associated acoustical relevance. The acoustical relevance includes a second probability score. Upon determining that the second probability score is below a second threshold, it is determined whether a match for the problem word exists in the secondary language corpus. Upon determining that the match exists in the secondary language corpus, a second transcription for the utterance is provided.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
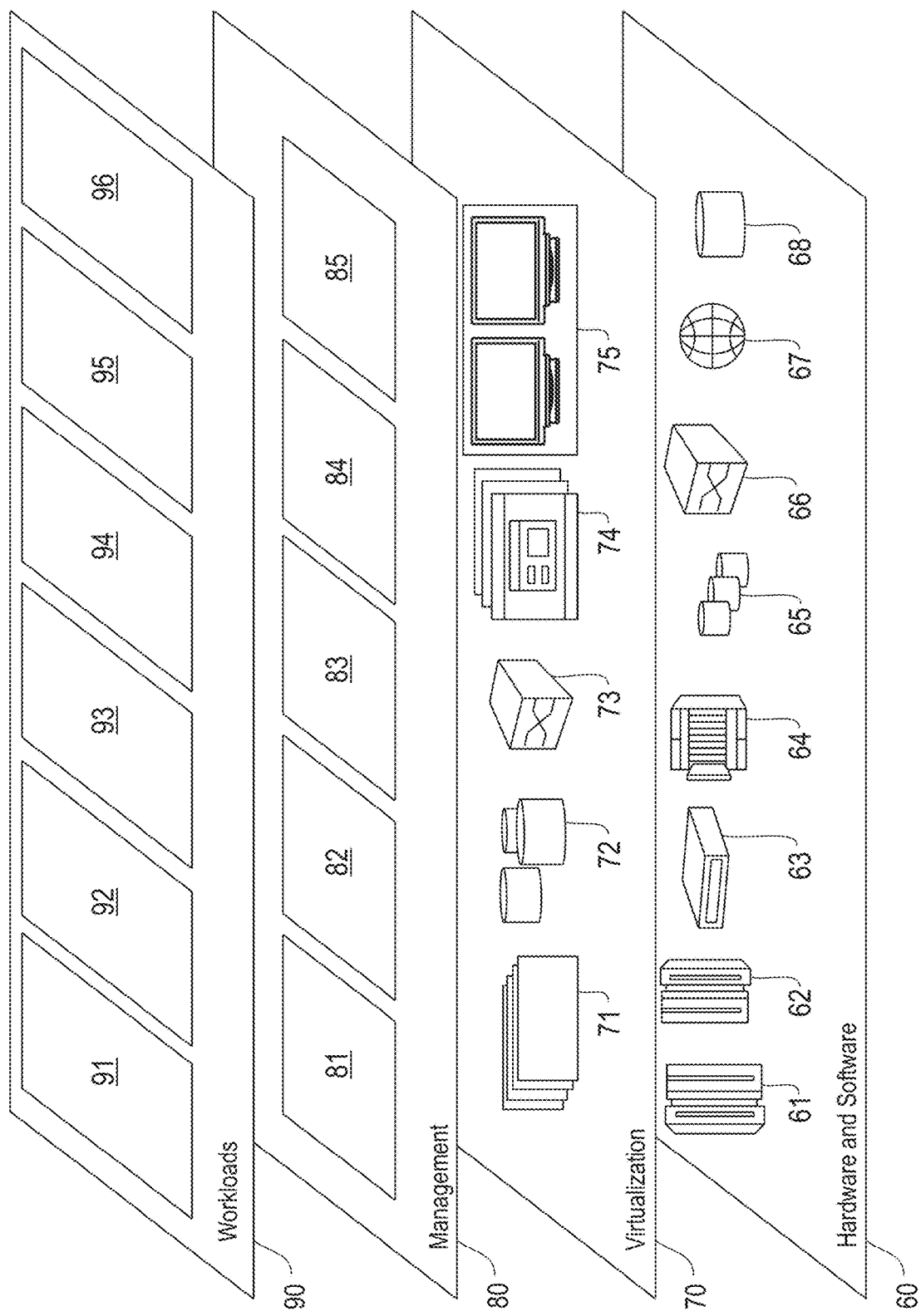
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, a management layer 80 can provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources can comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and STT processing with primary, secondary, etc. languages processing 96. As mentioned above, all of the foregoing examples described with respect to FIG. 2 are illustrative only, and the embodiments are not limited to these examples.

It is understood all functions of one or more embodiments as described herein can be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments can be implemented with any type of clustered computing environment now known or later developed.

Figure 3:
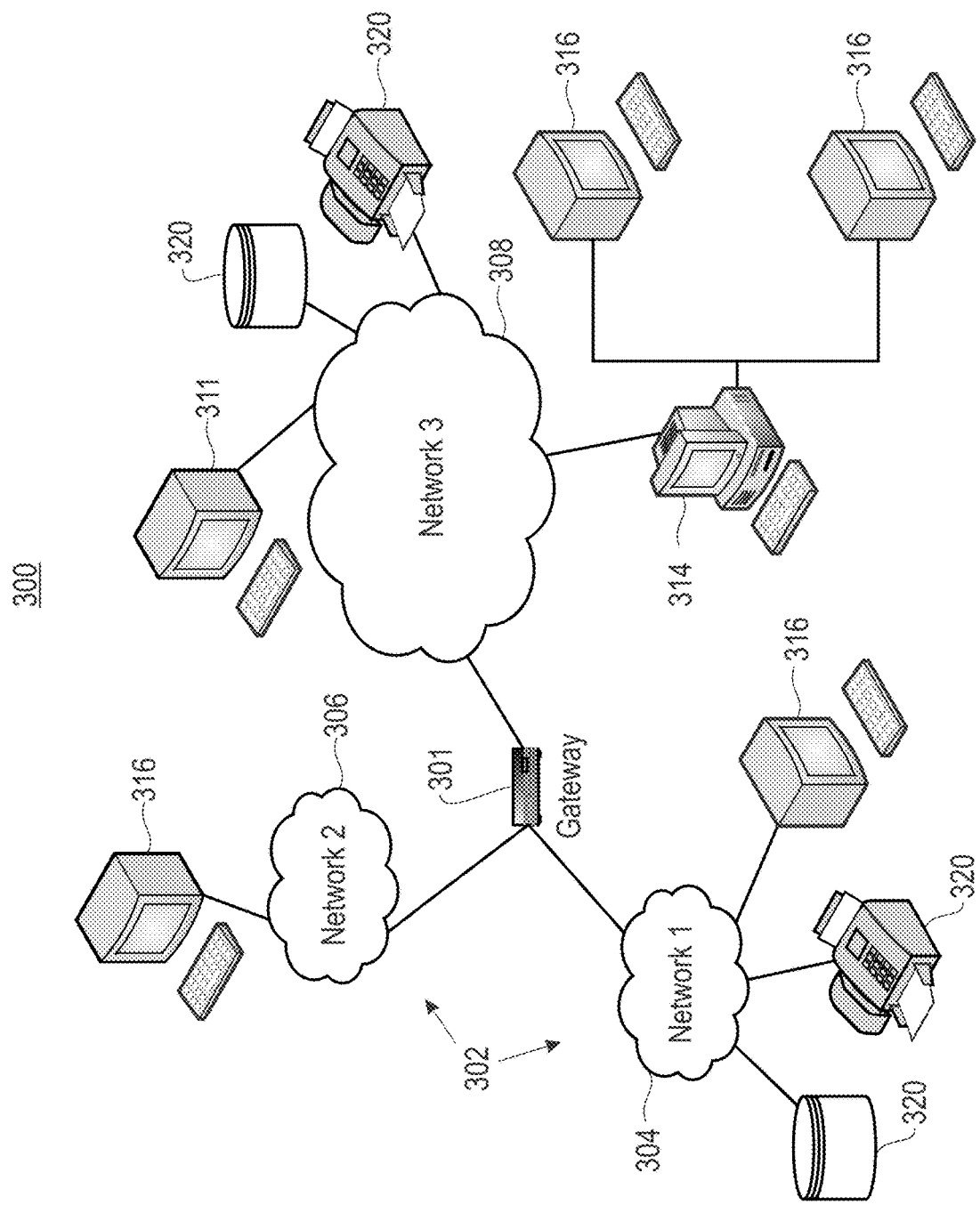
FIG. 3 is a network architecture of a speech-to-text (STT) system with primary, secondary, etc. languages, according to an embodiment.

FIG. 3 is a network architecture of a system for STT with primary, secondary, etc. languages, in accordance with one embodiment. As shown in FIG. 3, a plurality of remote networks 302 are provided, including a first remote network 304 and a second remote network 306. A gateway 301 can be coupled between the remote networks 302 and a proximate network 308. In the context of the present network architecture 300, the networks 304, 306 can each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 can function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 can include any type of computing device/groupware. Coupled to each data server 314 is a plurality of user devices 316. Such user devices 316 can include a desktop computer, laptop computer, handheld computer, printer, and/or any other type of logic-containing device. It should be noted that a user device 316 can also be directly coupled to any of the networks in some embodiments.

A peripheral 320 or series of peripherals 320, e.g., facsimile machines, printers, scanners, hard disk drives, networked and/or local storage units or systems, etc., can be coupled to one or more of the networks 304, 306, 308. It should be noted that databases and/or additional components can be utilized with, or integrated into, any type of network element coupled to the networks 304, 306, 308. In the context of the present description, a network element can refer to any component of a network.

According to some approaches, methods and systems described herein can be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation can be implemented through the use of VMWARE software in some embodiments.

Figure 4:
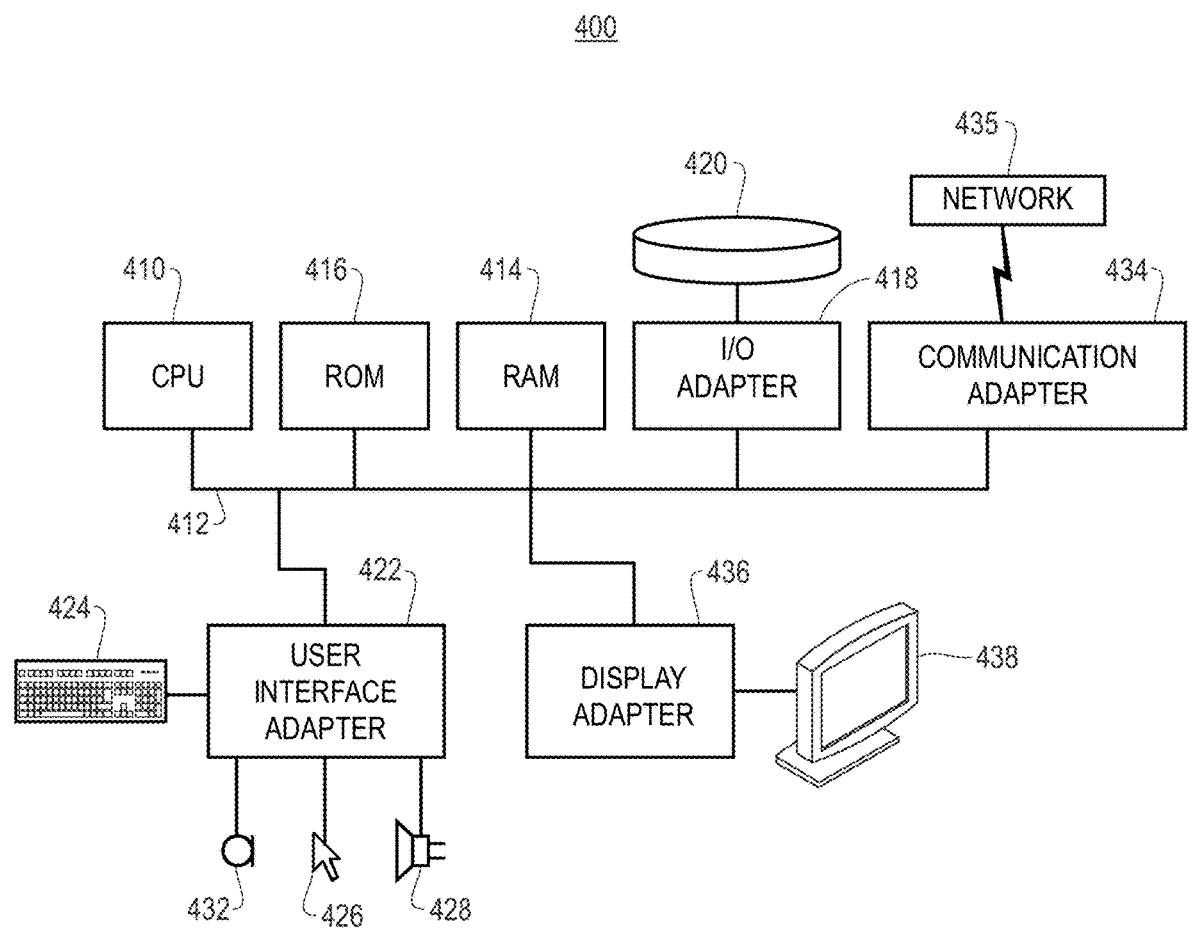
FIG. 4 shows a representative hardware environment that can be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 can include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation can have resident thereon an operating system, such as the MICROSOFT WINDOWS Operating System (OS), a MAC OS, a UNIX OS, etc. In one embodiment, the system 400 employs a POSIX® based file system. It will be appreciated that other examples can also be implemented on platforms and operating systems other than those mentioned. Such other examples can include operating systems written using JAVA, XML, C, and/or C++ language, or other programming languages, along with an object oriented programming methodology. Object oriented programming (OOP), which has become increasingly used to develop complex applications, can also be used.

Multi-lingual STT support is important for a variety of applications in the enterprise. For example, research employees can come from international backgrounds. Conventional STT transcription processing operates based on acoustic modeling or grammar modeling, but not a sophisticated combination of both. Conventional STT shows multilingual STT operation based on acoustic properties of language and not the combination of linguistic (e.g., grammatical, semantic) and acoustics.

Figure 5:
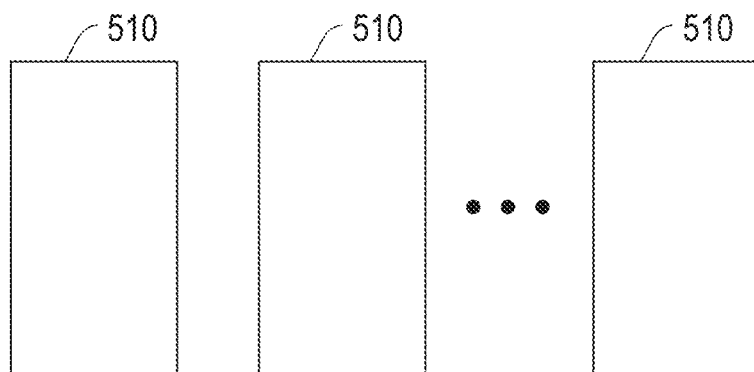
FIG. 5 is a block diagram illustrating a distributed system that can be employed for STT with primary, secondary, etc. languages, according to one embodiment.
Figure 5:
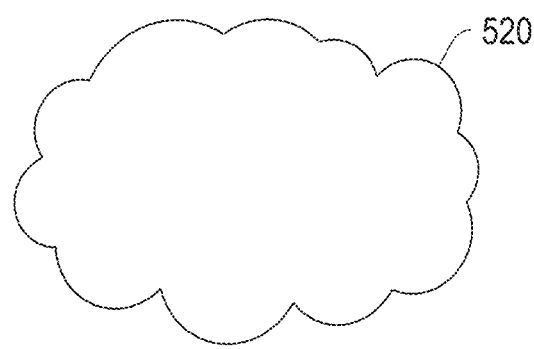
Figure 5:
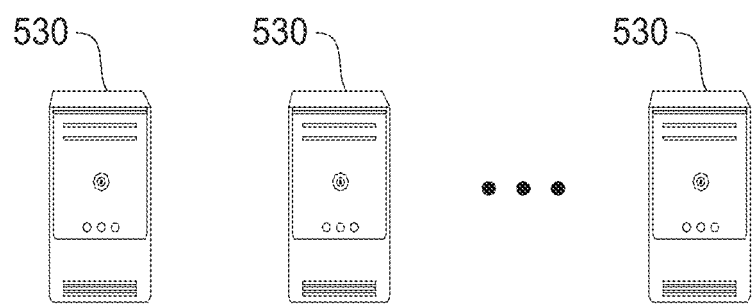

FIG. 5 is a block diagram illustrating a distributed system 500 that can be employed for STT with primary, secondary, etc. languages, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500 includes STT processing that relies on one or more acoustic models and at least a primary language model and a secondary language model. In one embodiment, for large vocabulary processing, one or more pronunciation models are employed. In order to optimize transcription quality, all of the above-mentioned models can be specialized for a given language, dialect, application domain, type of speech, and communication channel. It should be noted that speech transcript accuracy is dependent on the speaker, style of speech and environmental conditions. From the user's point of view, STT processing can be categorized based in its use: command and control, dialog system, text dictation, audio document transcription, etc. Each use has specific requirements in terms of latency, memory constraints, vocabulary size, and adaptive features.

In conventional STT conversion processing, three steps are required. Processing first identifies the audio segments containing speech, then processing recognizes the language being spoken if it is not known a priori, and processing then converts the speech segments to text and time-codes. In one or more embodiments, given primary and secondary (or tertiary, etc.) language preferences in a user's profile (e.g., from a system, social media platform, application, website, etc.) and languages spoken, system 500 including STT processing can transcribe text in two languages. In one embodiment, by using real-time Natural Language Processing (NLP), an utterance (e.g., spoken, text, etc.) can be assessed by system 500 to determine the likelihood of a match to multiple preferred languages stored in a user's profile. If a word is spoken in the secondary (or beyond secondary, e.g., tertiary, etc.) language, system 500 first looks for an audible match in the primary language corpus and determines its relevance to the utterance using NLP. By computing a score for the word with respect to the utterance, system 500 determines its relevance. In one embodiment, relevance is assessed by a score that is above a threshold score, where threshold is a probability threshold and is user-defined, algorithmically learned, etc. If the relevance score falls below the threshold, system 500 then applies STT processing to the preferred secondary language in order to look for a match in the secondary language corpus.

In one embodiment, system 500, provides for phonetic and semantic utterance matches, and multiple languages are processed in a prioritized manner. That is, STT transcription is performed by system 500 with primary, secondary, etc. languages, where the multilingual STT operation is based on a combination of both acoustic and grammar modeling. Based on a user profile, the STT processing transcribes in multiple languages, and NLP is used to match speech to languages referenced and stored in the user's profile. In one embodiment, a score is computed for each word so that system 500 can determine its relevance. Once determined to be above the threshold, processing is carried out to find a match. The context is also analyzed to check for grammatical correctness of the spoken utterance. The processing is refined through the use of an algorithm (e.g., machine learning) to keep refining it and adding more words to the corpus of transcription data.

Figure 6:
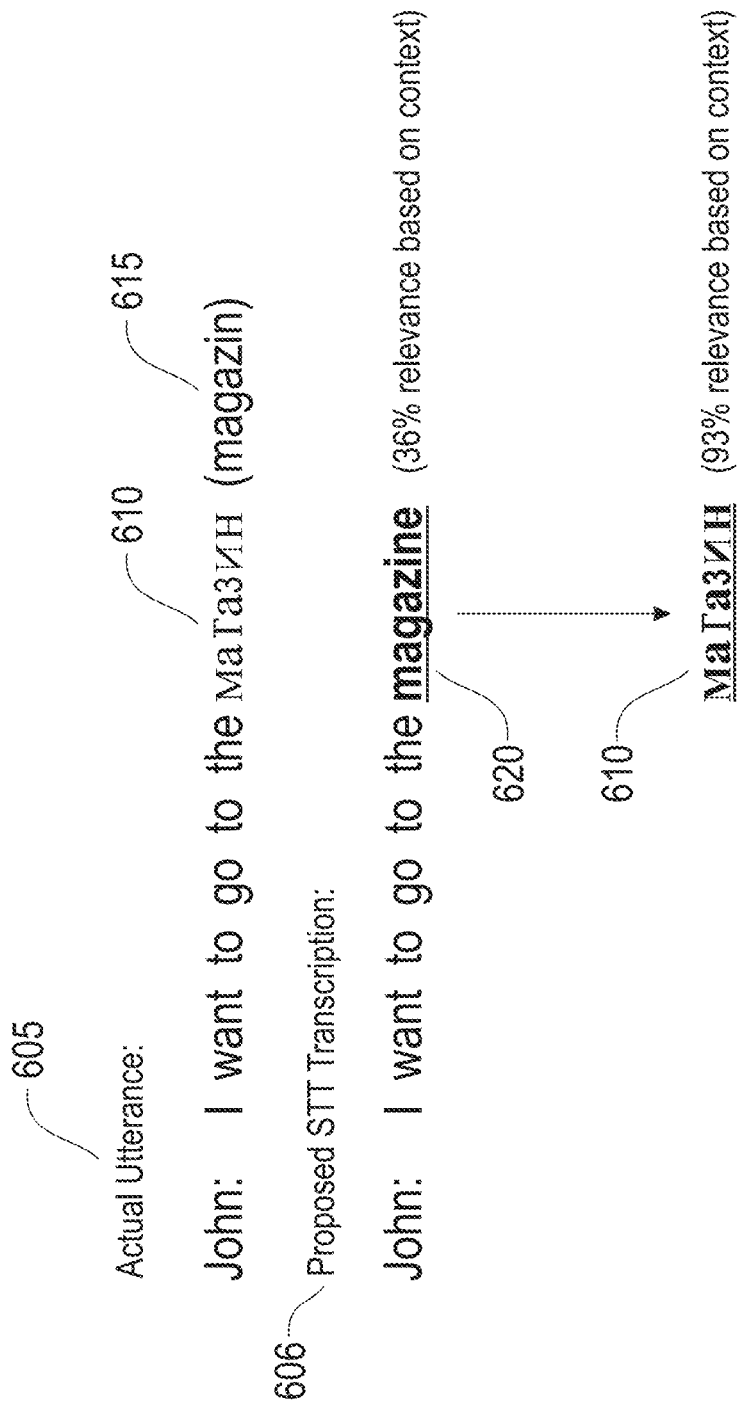
FIG. 6 illustrates an example spoken utterance for STT transcription with primary and secondary languages, according to one embodiment.

FIG. 6 illustrates an example spoken utterance 605 for STT transcription with primary and secondary languages, according to one embodiment. It should be noted that while the example provides for STT transcription with primary and secondary languages, additional languages beyond a primary and secondary language may be processed by one or more embodiments provided that the profile includes the additional preferred languages and the STT system provides support for the additional languages. In the example utterance 605 ("I want to go to the магазин"), an example user, John, has a profile that specifies English as his preferred primary language, and Russian as his preferred secondary language. The word " магазин " 610 in Russian translates to "store" in English, but sounds like "magazine" 615 in English. Based on STT processing by at least one processor in the system (e.g., at least one processor from computing node 10, FIG. 1, processing system 300, FIG. 3, system 400, FIG. 4, system 500, FIG. 5, etc.), the proposed STT transcription 606 includes "I want to go to the magazine" with magazine 620 having a 36% relevance based on context, but based on the secondary language preference and transcription corpus, the processing finds that " магазин " 610 has a 93% relevance based on context.

Figure 7:
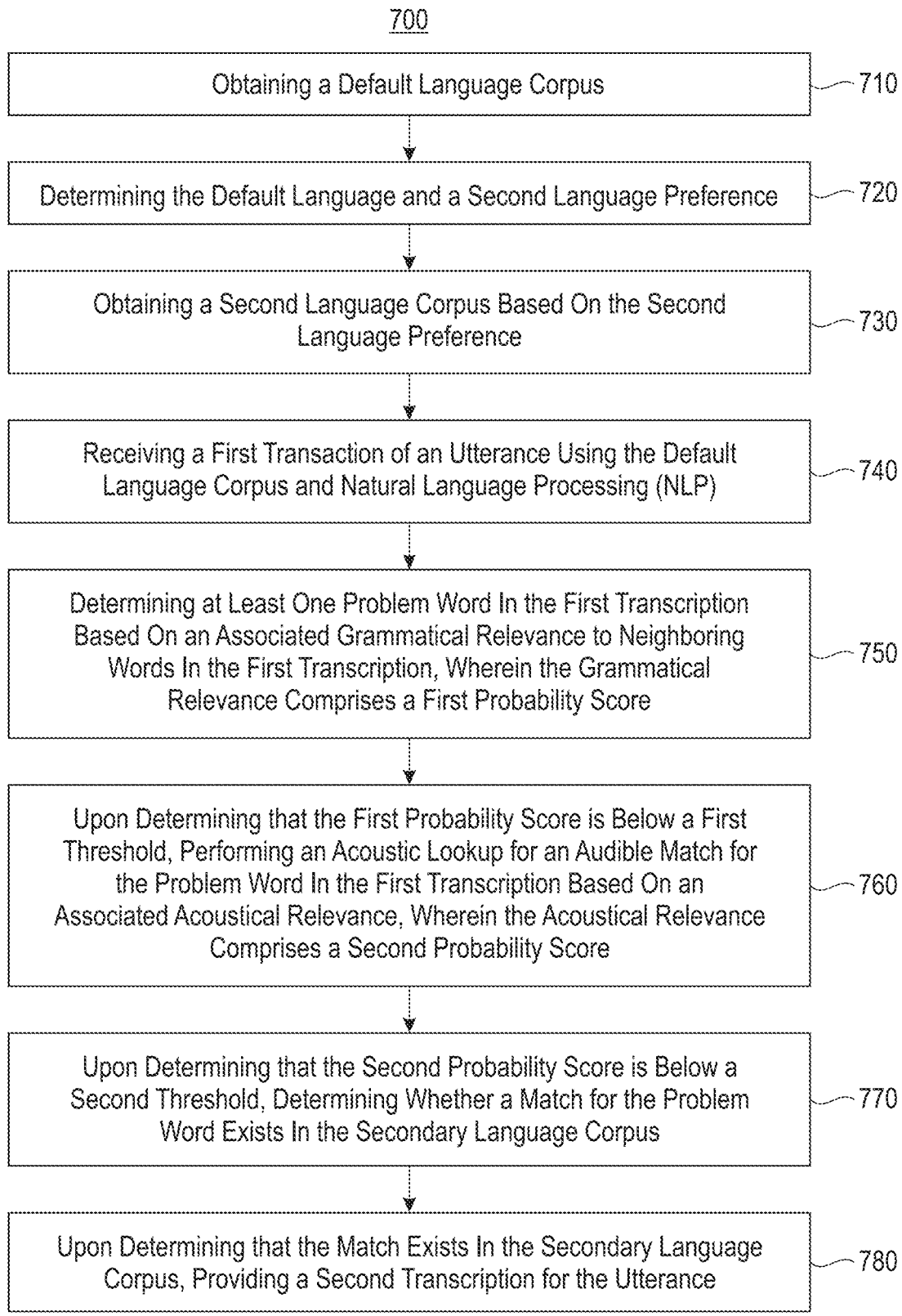
FIG. 7 illustrates a block diagram of a process for STT processing with primary and secondary languages, according to one embodiment.

FIG. 7 illustrates a block diagram of a process 700 for bilingual (or multilingual beyond bilingual) STT transcription, according to one embodiment. In block 710, process 700 obtains a default language corpus, e.g., an English language transcription corpus, etc., stored in a system (e.g., computing node 10, FIG. 1, processing system 300, FIG. 3, system 400, FIG. 4, system 500, FIG. 5, etc.). In block 720, process 700 determines the default language (e.g., based on the corpus, based on geographic location, based on other local users, etc.) and a second language preference (e.g., based on a profile, based on probabilities of one language used in conjunction with another language based on a set of users and their associated spoken languages, etc.). In block 730 process 700 obtains a second language corpus (e.g., stored in a system (e.g., computing node 10, FIG. 1, processing system 300, FIG. 3, system 400, FIG. 4, system 500, FIG. 5, etc.) based on the second language preference. In block 740 process 700 receives a first transcription of an utterance (e.g., speech, text, etc.) using the default language corpus and NLP. In block 750 process 700 determines at least one problem word (e.g., a word that does not fit within the context of neighboring words, etc.) in the first transcription based on an associated grammatical relevance to neighboring words in the first transcription (where the grammatical relevance comprises a first probability score). In block 760 upon determining that the first probability score is below a first threshold, process 700 performs an acoustic lookup for an audible match for the problem word in the first transcription based on an associated acoustical relevance, wherein the acoustical relevance comprises a second probability score. In block 770 upon determining that the second probability score is below a second threshold, process 700 determines whether a match for the problem word exists in the secondary language corpus. In block 780 upon determining that the match exists in the secondary language corpus, process 700 provides a second transcription for the utterance.

In one embodiment, in process 700 the default language is set by an STT system. In one embodiment, determining the second language preference includes obtaining the second language preference from a user profile (e.g., from an application, a web site, a social media platform, an Enterprise platform, etc.). In one embodiment, additional language preferences are obtained from the user profile if applicable. In one embodiment, in process 700 the first transcription is an acoustic transcription of the utterance and is based on a pre-existing corpus of transcription data from the default language.

In one embodiment, in process 700 the utterance is grammatically incorrect. In one embodiment, in process 700 the first threshold is a first probability threshold, the second threshold is a second probability threshold, and the first probability threshold and the second probability threshold are each user-defined or algorithmically learned.

In one embodiment, in process 700 grammatical relevance is based on a grammar learning model (e.g., based on machine learning, neural networks, etc.), and acoustical relevance is based on an acoustic learning model (e.g., based on machine learning, neural networks, etc.). In one embodiment, in process 700 STT processing is refined through use of machine learning to refine the STT processing and add more words to a corpus of transcription data.

As will be appreciated by one skilled in the art, aspects of the present embodiments can be embodied as a system, method or computer program product. Accordingly, aspects of the present embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present embodiments can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present embodiments can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present embodiments are described below with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

What is claimed is:

1. A method for bilingual speech-to-text (STT) transcription, comprising:
   determining multiple languages spoken by a user, wherein the multiple languages include a default language and a second language preference; and
   performing STT processing using machine learning based on a combination of an acoustic learning model and a grammar learning model, wherein the STT processing comprises:
      applying natural language processing (NLP) to an utterance of the user to generate a first STT transcription of the utterance, wherein the first STT transcription is based on a default language corpus for the default language;
      identifying, based on the grammar learning model, at least one word in the first STT transcription that does not fit within a context of one or more neighboring words in the first STT transcription, wherein the one or more neighboring words are in the default language, and grammatical relevance of the at least one word to the one or more neighboring words is less than a pre-determined threshold;
      determining, based on the acoustic learning model, an audible match in a second language corpus for the second language preference that is phonetically similar to the at least one problem word, wherein the audible match is in the second language preference, and grammatical relevance of the audible match to the one or more neighboring words is higher than the grammatical relevance of the at least one word to the one or more neighboring words; and
      replacing the at least one word in the first STT transcription with the audible match to generate a second STT transcription of the utterance, wherein the second STT transcription comprises the audible match in the second language preference and the one or more neighboring words in the default language.

2. The method of claim 1, further comprising:
   determining the multiple languages spoken by the user based on a user profile of the user.

3. The method of claim 2, further comprising:
   determining the multiple languages spoken by the user further based on probabilities of one language used in conjunction with another language based on a set of users and their spoken languages.

4. The method of claim 1, wherein the at least one word is grammatically incorrect based on the context of the one or more neighboring words.

5. A computer program product for bilingual speech-to-text (STT) transcription, the computer program product comprising a non-transitory computer readable storage medium having program instructions embodied therewith, the program instructions executable by a processor to cause the processor to:
   determine multiple languages spoken by a user, wherein the multiple languages include a default language and a second language preference; and
   perform STT processing using machine learning based on a combination of an acoustic learning model and a grammar learning model, wherein the STT processing comprises:
      applying natural language processing (NLP) to an utterance of the user to generate a first STT transcription of the utterance, wherein the first STT transcription is based on a default language corpus for the default language;
      identifying, based on the grammar learning model, at least one word in the first STT transcription that does not fit within a context of one or more neighboring words in the first STT transcription, wherein the one or more neighboring words are in the default language, and grammatical relevance of the at least one word to the one or more neighboring words is less than a pre-determined threshold;
      determining, based on the acoustic learning model, an audible match in a second language corpus for the second language preference that is phonetically similar to the at least one problem word, wherein the audible match is in the second language preference, and grammatical relevance of the audible match to the one or more neighboring words is higher than the grammatical relevance of the at least one word to the one or more neighboring words; and
      replacing the at least one word in the first STT transcription with the audible match to generate a second STT transcription of the utterance, wherein the second STT transcription comprises the audible match in the second language preference and the one or more neighboring words in the default language.

6. The computer program product of claim 5, the program instructions executable by the processor to further cause the processor to:
   determine the multiple languages spoken by the user based on a user profile of the user.

7. The computer program product of claim 6, the program instructions executable by the processor to further cause the processor to:
   determine the multiple languages spoken by the user further based on probabilities of one language used in conjunction with another language based on a set of users and their spoken languages.

8. The computer program product of claim 5, wherein the at least one word is grammatically incorrect based on the context of the one or more neighboring words.

9. An apparatus for bilingual speech-to-text (STT) transcription, comprising:
- a memory configured to store instructions; and
- a processor configured to execute the instructions to:
- determine multiple languages spoken by a user, wherein the multiple languages include a default language and a second language preference; and
- perform STT processing using machine learning based on a combination of an acoustic learning model and a grammar learning model, wherein the STT processing comprises:
  - applying natural language processing (NLP) to an utterance of the user to generate a first STT transcription of the utterance, wherein the first STT transcription is based on a default language corpus for the default language;
  - identifying, based on the grammar learning model, at least one word in the first STT transcription that does not fit within a context of one or more neighboring words in the first STT transcription, wherein the one or more neighboring words are in the default language, and grammatical relevance of the at least one word to the one or more neighboring words is less than a pre-determined threshold;
  - determining, based on the acoustic learning model, an audible match in a second language corpus for the second language preference that is phonetically similar to the at least one problem word, wherein the audible match is in the second language preference, and grammatical relevance of the audible match to the one or more neighboring words is higher than the grammatical relevance of the at least one word to the one or more neighboring words; and
  - replacing the at least one word in the first STT transcription with the audible match to generate a second STT transcription of the utterance, wherein the second STT transcription comprises the audible match in the second language preference and the one or more neighboring words in the default language.

10. The apparatus of claim 9, the processor further configured to execute the instructions to:
- determine the multiple languages spoken by the user based on a user profile of the user.

11. The apparatus of claim 10, the processor further configured to execute the instructions to:
- determine the multiple languages spoken by the user further based on probabilities of one language used in conjunction with another language based on a set of users and their spoken languages.

12. The apparatus of claim 10, wherein the at least one word is grammatically incorrect based on the context of the one or more neighboring words.

* * * * *